US009864637B2

(12) United States Patent
Osborne et al.

(10) Patent No.: US 9,864,637 B2
(45) Date of Patent: Jan. 9, 2018

(54) ADAPTABLE SOFTWARE RESOURCE MANAGERS BASED ON INTENTIONS

(75) Inventors: Craig Anthony Osborne, Issaquah, WA (US); Souren Aghajanyan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1317 days.

(21) Appl. No.: 12/406,432

(22) Filed: Mar. 18, 2009

(65) Prior Publication Data

US 2010/0242044 A1 Sep. 23, 2010

(51) Int. Cl.
G06F 9/50 (2006.01)

(52) U.S. Cl.
CPC .......... G06F 9/5011 (2013.01); G06F 9/5044 (2013.01)

(58) Field of Classification Search
CPC .............................. G06F 9/5044; G06F 9/5055
See application file for complete search history.

(56) References Cited

U.S. PATENT DOCUMENTS

| | | | |
|---|---|---|---|
| 7,191,329 B2 | 3/2007 | Murphy | |
| 7,228,546 B1 | 6/2007 | McCarthy et al. | |
| 2005/0204040 A1 | 9/2005 | Ferri et al. | |
| 2005/0267948 A1 | 12/2005 | McKinley et al. | |
| 2006/0010229 A1 | 1/2006 | Chen et al. | |
| 2007/0050776 A1 | 3/2007 | Ferren et al. | |
| 2007/0204266 A1 * | 8/2007 | Beaty et al. | 718/1 |
| 2008/0034365 A1 * | 2/2008 | Dahlstedt | 718/1 |
| 2008/0034370 A1 | 2/2008 | Huizenga | |
| 2008/0082977 A1 * | 4/2008 | Araujo et al. | 718/1 |
| 2008/0244600 A1 | 10/2008 | Wong et al. | |
| 2009/0016220 A1 * | 1/2009 | Uysal et al. | 370/232 |
| 2009/0199196 A1 * | 8/2009 | Peracha | 718/104 |
| 2010/0082320 A1 * | 4/2010 | Wood et al. | 703/22 |

OTHER PUBLICATIONS

Beresniewicz, John. "Metric Baselines: Detecting unusual performance events using system-level metrics in EM 1OGR2" Oracle, Mar. 2005.*

(Continued)

*Primary Examiner* — Jacob A Petranek
(74) *Attorney, Agent, or Firm* — The Watson IP Group, PLC; Vladan M. Vasiljevic (57) ABSTRACT

User intentions can be derived from observations of user actions or they can be programmatically specified by an application or component that is performing an action. The intentions can then be utilized to adjust the operation of resource managers to better suit the actions being performed by the user or application, especially if such actions are not "typical". Resource managers can inform a centralized intention manager of environmental constraints, including constraints on the resources they manage and constraints on their operation, such as various, pre-programmed independent modes of operation optimized for differencing circumstances. The intention manager can then instruct the resource managers in accordance with these environmental constraints when the intention manager is made aware of the intentions. If no further optimization can be achieved, specified intentions may not result in directives from the intention manager to the resource managers.

20 Claims, 5 Drawing Sheets

(56) References Cited

OTHER PUBLICATIONS

Bensch, et al., "Self-Learning Prediction System for Optimisation of Workload Management in a Mainframe Operating System", Retrieved at <<http://www-ti.informatik.uni-tuebingen.de/~spruth/Mirror/iceis.pdf>>, ICEIS 2007—International Conference on Enterprise Information Systems, pp. 212-218.

Hollfelder, et al., "Mining User Behavior for Resource Prediction in Interactive Electronic Malls", Retrieved at <<http://ieeexplore.ieee.org/stamp/stamp.jsp?arnumber=871496&isnumber=18880>>, Jan. 28, 2009, pp. 863-866.

"Moab Hybrid Cluster a Mixed Windows/Linux Cluster Solution", Retrieved at <<http://download.microsoft.com/download/c/3/1/c318044c-95e8-4df9-a6af-81cdcb3c53c5/ClusterResources_Windows_Linux_Hybrid_Cluster.pdf>>, 2007, pp. 2.

\* cited by examiner

ADAPTABLE SOFTWARE RESOURCE MANAGERS BASED ON INTENTIONS

BACKGROUND

Traditional product design methodologies call for the design of a product to be optimized for specific usage patterns, often at the expense of other usage patterns that are deemed to be less relevant. For simple products, the specific usage patterns for which the product is designed may be easy to pre-determine and the design of the product can proceed accordingly, while, for more complex products, product testing may be required to identify usage patterns that represent a "typical" usage pattern towards which the product design is to be directed.

The design of systems comprising computer-executable instructions traditionally follow similar design methodologies. Often systems comprising computer-executable instructions, such as software application programs, or other software components, are subjected to user tests whereby the interaction of users with the application or component is observed. The design of the application or component can be, thereafter, driven by such tests to, for example, optimize the application or component in accordance with usage patterns that are deemed to be "typical". Often the identification of such usage patterns is based on a statistical analysis of user's behavior, with "typical" usage being that which is most often encountered.

Unfortunately, designing products, including application programs or components comprising computer-executable instructions, for "typical" usage patterns results in design decisions that may produce a sub-optimal design when the product is used in an "atypical" manner. For example, a database product for which a typical usage pattern is found to comprise a large amount of data entry or data editing may be designed in such a manner that such data entry or data editing is performed in an optimal manner, while the ability of that database to perform other, less "typical" tasks efficiently, such as, for example, browsing and displaying data, may be sub-optimal and inefficient.

Because computer-executable application programs and components require various computational resources, such as memory capacity or processor capacity, the traditional solution to the above-described design limitations has been to dynamically adjust the computational resources devoted to a particular application program, component, or other task performed by the execution of computer-executable instructions. Thus, for example, a limited amount of memory or processor capacity can be shared among multiple executing processes by continually monitoring the processes and allowing that process which is most in need of the resources to utilize the resources at that time. Resource managers, therefore, have sought to overcome design limitations by dynamically assigning resources in an optimal manner.

SUMMARY

Rather than attempting to find yet another optimal algorithm by which resources can be managed by resource managers, an adaptable resource manager can be designed that can manage and utilize resources in accordance with multiple different algorithms and operations. In such a case, the adaptable resource manager can change, not only the assignment of resources, but the very mechanisms by which the resource assignment occurs.

In one embodiment, a user's intentions can be inferred based on the user's current actions and their prior actions. Such intentions can be communicated to an intention manager that can utilize the intentions to select from among multiple different configurations of one or more resource managers. The intention manager can then select an appropriate configuration or other set of actions for the one or more resource managers and can direct the resource managers appropriately.

In another embodiment, intentions can be indicated programmatically, rather than being inferred based on observed actions. While such intentions can include user intentions, they can likewise include the intentions of other application programs, utilities, or components thereof.

In still another embodiment, resource managers can be designed to support multiple, independent, and sometimes even contradictory, modes of operation. The resource managers can inform an intention manager of their capabilities and can likewise inform the intention manager of relevant static and ongoing environmental limitations or constraints. The resource managers can then operate in accordance with the mode or capability selected by the intention manager.

In a further embodiment, the intention manager can instruct resource managers that are not directly related to the user's intentions so as to optimize an overall computing system or environment in accordance with the user's intentions.

In a still further embodiment, the intention manager can determine that multiple user intentions may conflict or otherwise require orthogonal optimizations and, consequently, no additional changes or instructions to the resource managers are required. The intention manager, in essence, can determine that, given the multiple user intentions, the state of the computing system cannot be made more optimal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the utilization of indicated intentions to reconfigure resource managers such that the resource managers manage the relevant resources in an optimal manner given the indicated intentions. The following description is not directed to mechanisms for managing the resources themselves, such as resource allocation algorithms and the like. Instead, the following description relates to the selection, based upon indicated intentions, from among multiple alternative pre-existing capabilities of resource managers. In such a manner, resource managers need not be designed in a singular manner to only be optimal in "typical" cases. Instead, resource managers can be designed to comprise multiple alternative capabilities such that one or more capabilities can be selected based on indicated intentions, thereby enabling the resource manager to itself be dynamically adjusted.

For purposes of illustration, the techniques described herein make reference to the utilization of indicated intentions within the context of specific software application programs, such as photo processing and organizational software application programs. Such references are strictly exemplary and are not intended to limit the mechanisms described to photo-specific or database-related application programs. Indeed, the techniques described are equally applicable to any resource managers within a computing system. Consequently, while the descriptions below will reference figures illustrating specific types of application programs, the scope of the descriptions is not intended to be so limited.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
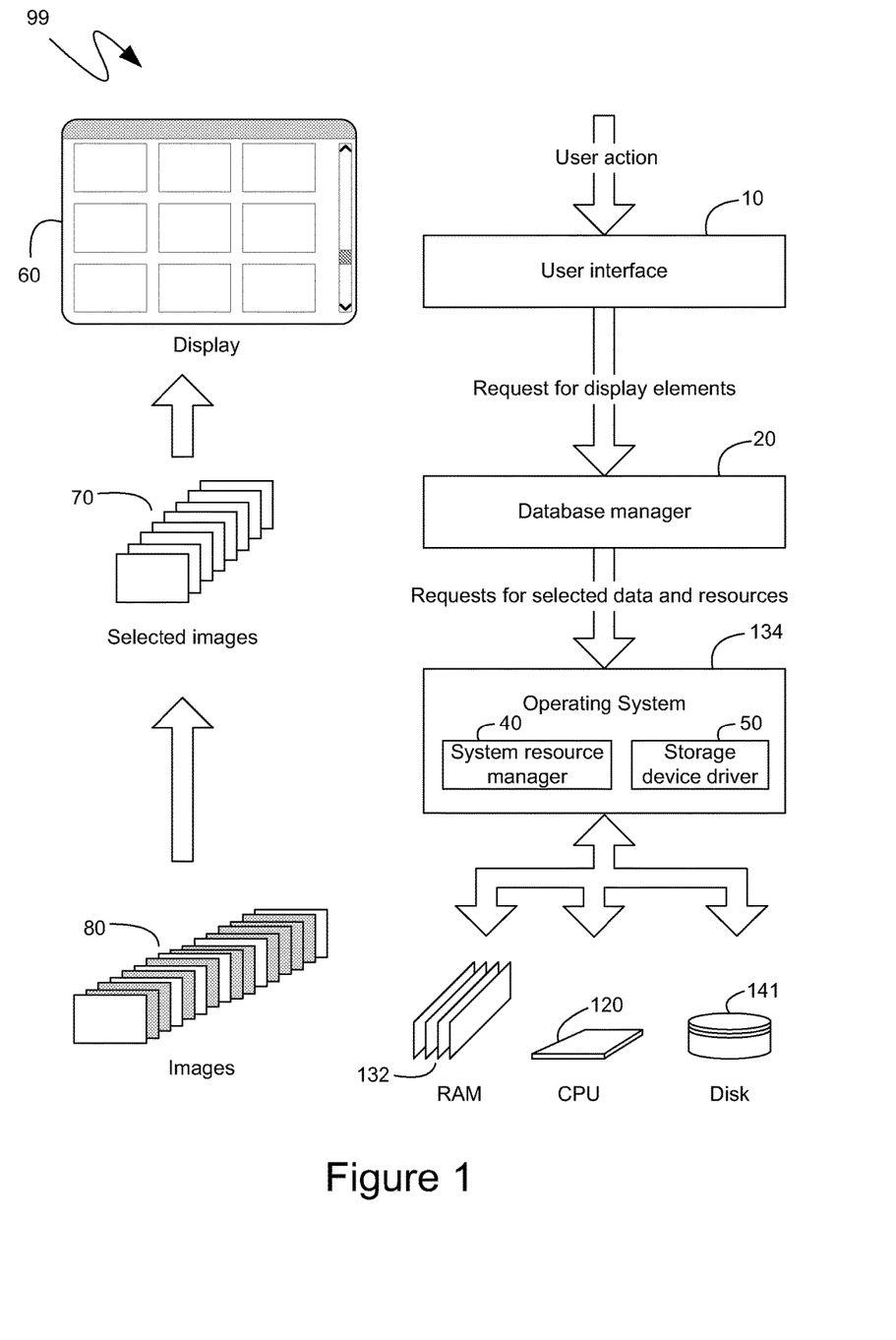
FIG. 1 is a block diagram of an exemplary software application program consuming computing resources.

With reference to FIG. 1, an exemplary computing environment 99 is illustrated, comprising a user interface 10 and a database manager 20 which can be part of a single software application program or, alternatively, which can be independently executable components. The exemplary computing environment 99 of FIG. 1 further comprises an operating system 134 that itself comprises a system resource manager 40 and a storage device driver 50. The system resource manager 40 and the storage device driver 50 can be utilized to provide and manage access to various resources of a computing device, such as the Random Access Memory (RAM) 132, one or more Central Processing Units (CPUs) 120 and one or more storage devices, such as the disk 141.

The user interface 10 can comprise computer-executable instructions that can receive and accept user input accomplished through user actions, as shown, and can respond to such user input, such as, for example, through audio/visual means. Strictly by way of example, the user interface 10 can be a user interface to a photo-centric application program. In such an example, the user interface 10 can generate a display 60 that can, for example, enable a user to browse through, organize, edit or otherwise interact with one or more digital photographs.

The database manager 20, on the other hand, need not comprise computer-executable instructions that can accept user input, but instead can comprise computer-executable instructions that can maintain and manage a collection of data, including providing access to the data, organizing the data, editing the data, and other like operations. Continuing with the example of the photo-centric application program, the database manager 20 can identify and provide images or other information, such as image metadata, to the user interface 10 for display in the display 60. Thus, as shown, the database manager can, based on the user's actions, obtain a group of selected images 70 from among the images 80 stored on, for example, the disk 141, and provide those selected images 70 to the user interface 10 to generate the display 60.

Typically, the database manager 20 will obtain the selected images 70 from the images 80 by utilizing one or more of the resources of the computing device on which the database manager is executing, such as the RAM 132, the CPU 120 and the disk 141. For example, in the illustrated example of system 99, the database manager 20 can select the selected images 70 by utilizing the CPU 120 to process data of the images 80 received from the disk 141. Additionally, the data being processed, as well as the instructions for processing the data provided by the database manager 20 can reside in RAM 132. To enable other computer-executable instructions to simultaneously utilize the computing resources, such as the RAM 132, the CPU 120 and the disk 141, the operating system 134, and, more specifically, one or more system resource managers, such as the system resource manager 40 and the storage device driver 50 can share the computing resources in accordance with the resource allocation algorithms with which they have been designed. Thus, for example, when the user's action, as received by the user interface 10, causes the database manager 20 to attempt to choose the selected images 70, the system resource manager 40 and the storage device driver 50 can provide the database manager 20 with a disproportionate share of the computing resources, such as the RAM 132, the CPU 120 and the disk 141. Subsequently, as the requirements of the database manager 20 decrease, the system resource manager 40 and the storage device driver 50 can reallocate the computing resources to other computer-executable instructions that may be executing at the same time as the database manager 20.

The allocation of resources by resource managers, such as the system resource manager 40 and the storage device driver 50, is performed in accordance with the allocation algorithm with which those resource managers were programmed. More specifically, the response of the resource managers to requests for resources, such as from the database manager 20, is based, in a predetermined and preprogrammed manner, on the amount of resources requested, the amount of resources currently provided to other computer-executable instructions, amount of resources available, and other factors that the resource allocation algorithm with which these resource managers were programmed can take into account.

However, while modern resource allocation algorithms can take into account many different factors in an effort to optimize the allocation of resources, a resource manager, at bottom, allocates resources according to only one algorithm—namely the one it was programmed with. And such an algorithm was selected because it yielded the optimal allocation of resources in "typical" conditions. In the example of system 99, the resource managers, such as the system resource manager 40 and the storage device driver 50 will respond in accordance with the same resource allocation algorithm irrespective of the user's intentions. For example, if the user's actions, as received by the user interface 10, were to browse the images 80, the database manager 20 would need to utilize computing resources to select the selected images 70 for display 60. Similarly, if the user's actions were to edit the metadata of specific images, the database manager 20 would again need to utilize computing resources to select the selected images 70 for display 60. In both cases, however, the response of resource managers, such as the system resource manager 40 and the storage device driver 50, assuming other factors were unchanged, would be the same.

In particular, since the algorithm by which the various resource managers determine how to respond to resource requests is fixed at design-time, the resource managers will respond to equivalent resource requests in an equivalent manner, even if the intention behind those resource requests is very different. And while such responses may be optimal in "typical" cases, they are not optimal in all cases. For example, if the user's intent is to browse the images 80, the database manager 20 may need to retain resources for a much longer period of time, since the continuous generation of thumbnails can be a resource intensive task. Alternatively, if the user's intent is to merely edit the metadata of specific images, the database manager 20 may not request resources as often and, consequently, the resource managers can direct resources away from the database manager without inefficiently having to rededicate them right back.

The above-described limitations of resource managers apply equally to resource managers outside of the context of the operating system 134, such as the database manager 20. In particular, a resource manager such as the database manager 20 is similarly designed in accordance with a single algorithm that is found to be optimal for "typical" usage scenarios. Thus, for example, the database manager 20 will select the selected images 70 and pass them to be displayed in the display 60 in the same manner irrespective of whether the user's intent was to browse the images 80 or whether it was to edit the metadata of specific images. And while such a manner may indeed provide for the optimal delivery and display of the selected images 70 for "typical" scenarios, there may exist scenario-specific optimizations that are not foregone. For example, in "typical" usage scenarios, it may be desirable to display, in the display 60, all of the selected images 70 prior to enabling a user to scroll down and, thereby, cause the display of another group of images. Thus, the database manager 20 may be optimized to select the selected images 70 and cause the display of all of them in as efficient a manner as possible. However, in a browsing scenario, it may be advantageous to allow the user to scroll down to other images as fast as possible, irrespective of whether all of the images on the display 60 have been fully rendered. If the database manager 20 was aware of the user's intent to browse, it could utilize an entirely different algorithm for the selection of the selected images 70. For example, the selected images 70 may represent only every other image on the display 60 such that, if the user remains on the images shown in display 60, the remaining images can be selected and displayed, but if the user continues to browse past, then the selection and display of half of the amount of images as would normally have been performed can result in efficiencies in the browsing scenario.

Mechanisms for detecting user intentions and utilizing them to instruct resource managers, thereby enabling resource managers to implement pre-determined scenario-specific algorithms, are described further below in light of the background presented with reference to system 99 and in light of the background presented with reference to the exemplary computing device 100 of FIG. 2.

Figure 2:
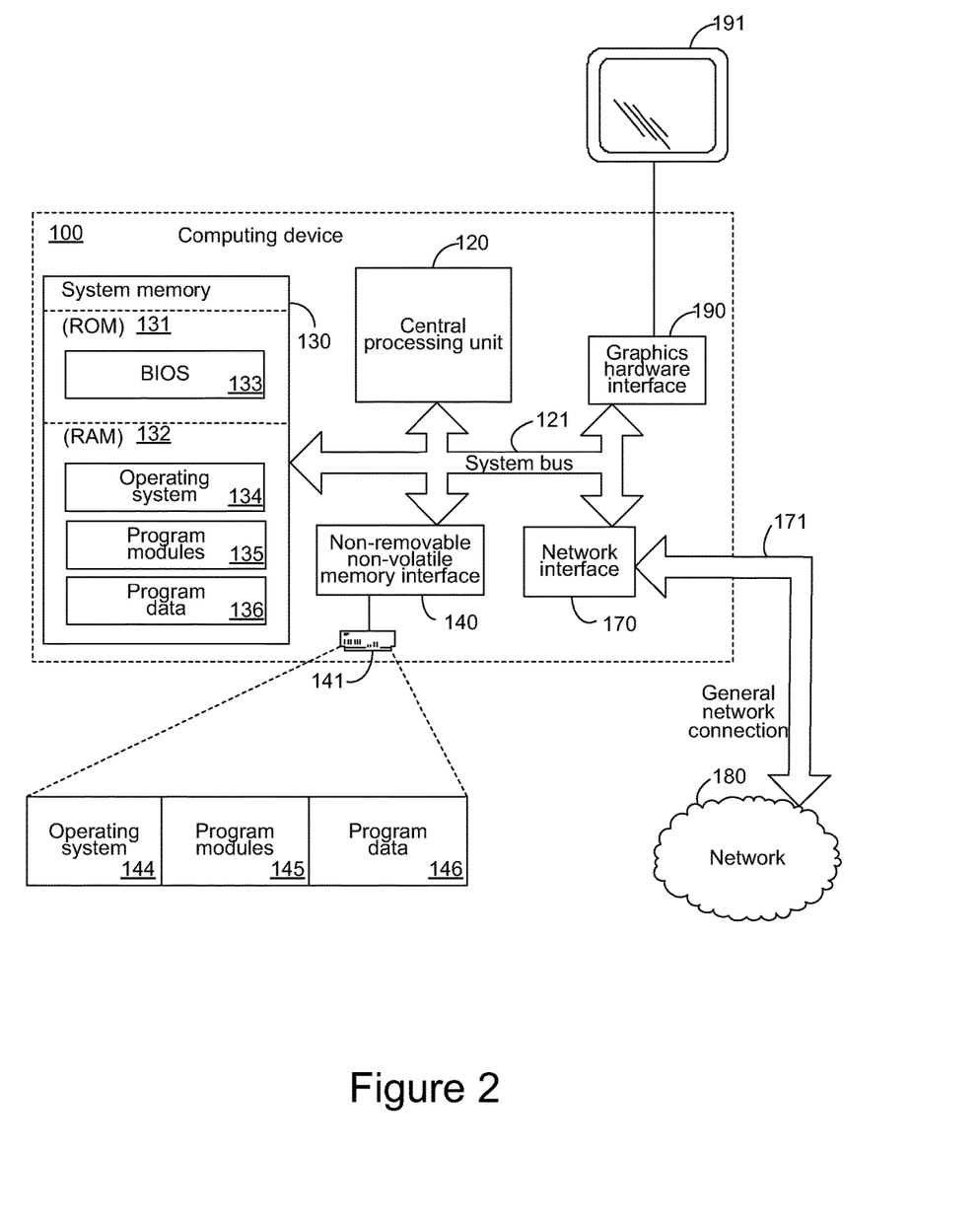
FIG. 2 is a block diagram of an exemplary computing device.

In particular, FIG. 2 illustrates an exemplary computing device 100, components of which, including the RAM 132 and the CPU 120 have been referenced previously in the system 99 of FIG. 1. The exemplary computing device 100 of FIG. 2 can include, but is not limited to, the one or more central processing units (CPUs) 120, a system memory 130, that can include the RAM 132, and a system bus 121 that couples various system components including the system memory to the processing unit 120. The system bus 121 may be any of several types of bus structures including a memory bus or memory controller, a peripheral bus, and a local bus using any of a variety of bus architectures. The computing device 100 can optionally include graphics hardware, such as for the display of the display 60, including, but not limited to, a graphics hardware interface 190 and a display device 191.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and the aforementioned RAM 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates the operating system 134 along with other program modules 135, and program data 136 which can include, for example, the user interface 10, the database manager 20, the selected images 70 and the images 80.

The computing device 100 may also include other removable/non-removable, volatile/nonvolatile computer storage media. By way of example only, FIG. 2 illustrates the hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 can operate in a networked environment using logical connections to one or more remote computers. For example, the computing device 100 is shown in FIG. 2 to be connected to a network 180 via a general network connection 171 that can be a local area network (LAN), a wide area network (WAN) or other network connection. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 3:
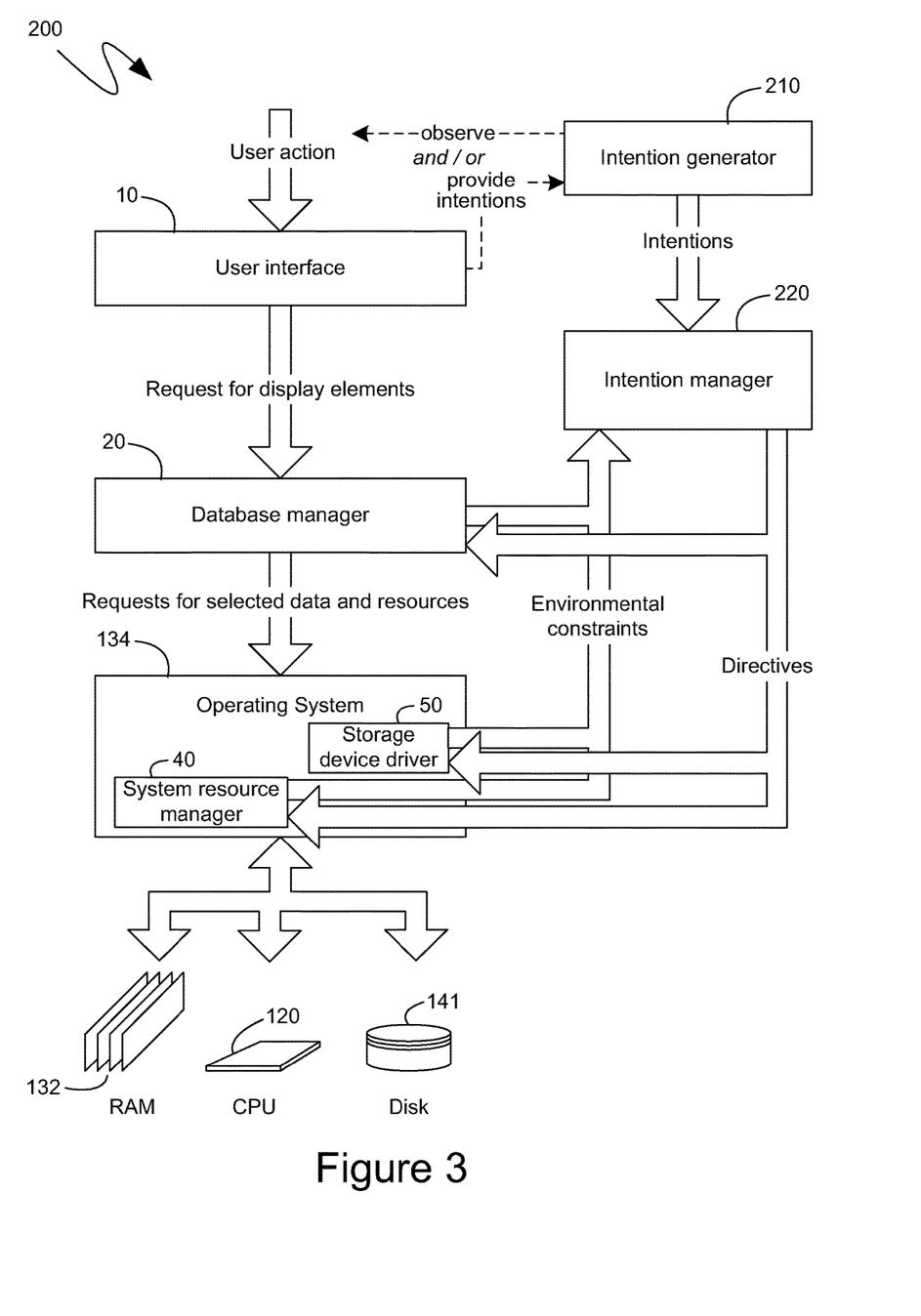
FIG. 3 is a block diagram of an exemplary software application program consuming computing resources whose management is changed in accordance with perceived user intentions.

Turning to FIG. 3, the system 200 illustrates the previously described user interface 10, database manager 20, operating system 134, and associated components, and various resources of the computing device, such as the RAM 132, the CPU 120 and the disk 141. The system 200 further illustrates an intention generator 210 and an intention manager 220. In one embodiment, as will be described further below, the intention generator 210 can observe user actions and can provide intentions to an intention manager 220 which can then, in turn, provide instructions or directives to various resource managers, such as the database manager 20, the system resource manager 40, the storage device driver 50 and other like managers. In another embodiment, which will also be described further below, the intention generator 210, or the intention manager 220, can receive programmatic indications of intentions, thereby reducing the chance that the user's actions may be misinterpreted. The intention manager 220 can also receive information from the various resource managers that can inform the intention manager of environmental constraints, such as the amount of RAM 132 and CPU 120 capacity managed by the system resource manager 40, or the various optimization or allocation algorithms with which the resource managers, such as the database manager 20, have been pre-programmed.

The intention generator 210, which is shown as a separate element, apart from the intention manager 220, in system 200, can be, in one embodiment, a separately executable component. In such an embodiment, application-specific intention generators, such as the intention generator 210, can be designed such that each application-specific intention generator is directed to recognize specific user actions or specific categories of actions in order to more accurately identify user intentions. For example, an intention generator directed towards image processing applications can be designed to distinguish between image browsing, image editing, imaging organizing, and similar categories of operations. In one embodiment, the categories of operations which an intention generator can be designed to recognize can be, not only categories of operations that are specific to particular types of application programs, but can also be categories of operations that can result in different utilization of resources, such that a distinction between them can aid the intention manager 220 in selecting a specific, optimal, mode of operation for one or more resource managers.

In an alternative embodiment, the intention generator 210 and the intention manager 220 can be a single package of computer-executable instructions. Such a package could still provide for application-specific intention generators through mechanisms, such as a plug-in architecture. Alternatively, a single, more generalized, intention generator 210 can be utilized for any application programs or other components with which a user interacts. Such a generalized intention generator 210 can still seek to identify categories of operations that can result in different utilization of resources, such that a distinction between them can aid the intention manager 220 in selecting a specific, optimal, mode of operation for one or more resource managers.

Initially, the intention generator 210 can observe and analyze a user's interaction with one or more application programs or other computer-executable components in order to establish a steady-state user behavior model from which the intention generator can deduce user intentions based on observed user actions. For example, by observing a user's actions over a sufficiently long period of time within which to establish a steady-state user behavior model, the intention generator 210 can determine that, while a "typical" user tends to perform certain actions only rarely, the user being observed performs those actions substantially more often. Such information, as will be shown, can enable the intention manager 220 to adjust the default behavior of one or more resource managers to match, and optimize, the management of resources, not for a "typical" user, but rather for the user being observed. Alternatively, by observing a user's actions over a sufficiently long period of time within which to establish a steady-state user behavior model, the intention generator 210 can determine that if a user performs a specific action or type of action, then the user is likely to perform another action, or type of action, or set of actions. Such information can, as will also be shown, enable the intention manager 220 to adjust the behavior of one or more resource managers on a per-use basis, such that the operation of the resource manager matches the user's intentions, as predicted based on previously observed action patterns.

Once the intention generator 210 has observed the user's actions for a sufficient period of time, the intention generator can begin providing user intentions to the intention manager 220. As used herein, the term "intention" means indicia of the users behavior or of a particular goal or result to be accomplished. Thus, as indicated, the provided intentions can, in one embodiment, inform the intention manager of a user's overall behavior pattern. For example, the intention generator 210 can generate one or more intentions that indicate that the observed user performs a specific action or type of action disproportionally often, as compared to a "typical" user. Returning to the above introduced example of a photo-centric application, the intention generator 210 can recognize, for example, that the observed user very rarely edits or organizes images and, instead, typically spends most of their time browsing. Such an observed behavior can differ from a "typical" user who may have been expected to spend only a small portion of their time browsing and, consequently, such behavior may not be receiving optimal support from resource managers that would likely have been optimized for a "typical user".

In another embodiment, the user intentions generated by the intention generator 210 can be based on specific, previously observed, usage patterns. Such intentions can be triggered by currently observed actions that fit previously observed usage patterns and, consequently, can be of a predictive nature. For example, if, in observing the user's actions, the intention generator 210 established that the user typically performs actions of the same type for an extended period of time, then, when the intention generator detects that the user has performed one action of that type, the intention generator can generate one or more intentions to inform the intention manager that the user's intention will likely be to continue performing actions of that same type. In the case of the referenced example of a photo-centric application, if the intention generator 210, in observing the user, determines that the user typically edits a digital image for an extended period of time, then the intention generator can, upon observing the user commence editing an image, provide an intention to the intention manager 220 indicating that the user's likely intention is to edit the image for an extended period of time.

In yet another embodiment, intentions can be based, not on observed user actions, such as was described in detail above, but rather on specific programmatic indications of intentions. Thus, as shown in FIG. 3, in such an alternative embodiment, rather than generating intentions based on observations of user action, the intention generator 210 can generate intentions based on specifically indicated intentions received by other application programs, utilities or components, including, for example, the user interface 10 of the system 200. Returning to the above example of a photo-centric application, rather than having the intention generator 210 generate an intention that the user will be editing an image, the user interface 10 can directly indicate that the user is now performing editing actions. Alternatively, such programmatically indicated intentions need not be based on, or originated by, user action. For example, the user interface 10 can display a dialog to the user that the database manager 20 will commence backing-up the database unless the user indicates otherwise. In such a case, without any user action at all, such a back-up operation can be performed and the user interface 10, or even the database manager 20, can provide a programmatic indication to the intention generator 210 that its intention is to perform a back-up action. As yet another alternative, while the above descriptions indicate the provision of programmatically indicated intentions to the intention generator 210, such programmatically indicated intentions can likewise be provided directly to the intention manager 220.

The intention manager 220, upon receiving intentions from the intention generator 210, or otherwise, can provide instructions or other directives to various resource managers to adjust the resource managers into a more optimum configuration given the intentions received. As indicated previously, resource managers are typically designed to manage resources in accordance with a management mechanism or algorithm that has been tuned to provide optimal resource management in a majority of circumstances, or in "typical" usage patterns. In one embodiment, resource managers that can accept and respond to directives from the intention manager 220 can, instead, be designed and implemented with multiple, independent resource management mechanisms or algorithms. Such independent mechanisms can even be contradictory since they are intended to be alternatives that can be selected and implemented in specific situations. Such resource managers can have a default algorithm or mechanism that can be optimized for "typical" usage patterns, or the majority of circumstances, as before, but can also comprise other algorithms or mechanisms that can provide for more optimal resource management in less typical or more unusual circumstances. In one embodiment, such additional mechanisms can be nothing more than additional options that the resource manager may not, by default, implement.

The design of the resource manager, as well as any other limitations on their operation, can be communicated as environmental constraints to the intention manager 220, as shown in the system 200 of FIG. 3. As used herein, the term "environmental constraints" means the limitations of the resource manager based either on its internal design or capabilities or based on the limited nature of resources, including both resources that the resource manager is managing and resources that the resource manager consumes or relies upon. Thus, in addition to the design of the resource manager itself, other limitations on the operation of a resource manager can include the limited quantity of the resource being managed, the overall abilities of the computing system on which the resource manager is executing, and other like limitations. For example, in the exemplary system 200 of FIG. 3, the system resource manager 40 can inform the intention manager 220 of the quantity of RAM 132, the capability of the CPU 120, and other like computing device resource limitations. The system resource manager 40 can likewise inform the intention manager 220 of its capabilities and options, such as, for example, the ability to withdraw system resources either faster or slower than it would perform such an action under default settings. The storage device driver 50 can likewise provide the intention manager 220 with both the limitations of the disk 141, such as its storage capacity or access speed, and the limitations of the storage device driver's own design, such as, for example, whether the storage device driver 50 has the ability to individually activate or deactivate specific functionality, such as error correction or redundancy checking functionality.

The database manager 20 can, like the system resource manager 40 or the storage device driver 50, likewise inform the intention manager 220 of its limitations. Because some resource managers, such as the database manager 20, may not manage physical resources, their limitations may be primarily an aspect of their design. Thus, for example, the database manager 20 may have been designed with multiple, alternative, and independent, mechanisms for managing the images 80 and providing selected images 70. In such a case, the database manager 20 can inform the intention manager 220 of such mechanisms. Alternatively, the database manager 20 may be able to internally respond and react to specific input information that can be related to specified intentions. For example, the database manager 20 may already have been designed to react differently, and manage its resources differently, if the specified intentions fall within specific categories or establish specific criteria. In such a case, the database manager 20 can inform the intention manager 220 of such categories of specified intentions for which the database manager knows how to optimize itself, or it can inform the intention manager of the criteria that it is capable of accepting. The intention manager 220 can then, as will be shown, utilize the specified intentions it receives to provide information to the, for example, database manager 20, in accordance with the categories or criteria indicated by the database manager.

In one embodiment, the intention manager 220 can, based on the environmental constraints and the specified intentions, provide instructions or information to one or more resource managers. As used herein, the term "directives" means either, or both, instructions to resource managers regarding their operation and information to the resource managers that the resource managers have indicated they can meaningfully consume to internally adjust their operation in accordance thereto. Thus, the directives provided by the intention manager 220 can include, for example, instructions to the system resource manager 40 to, for example, provide a greater, or smaller, proportion of resources, such as RAM 132 storage capacity or CPU 120 processing capacity to one or more software application programs or other components of computer-executable instructions. The directives provided by the intention manager 220 to the system resource manager 40 can also include instructions to modify specific aspects of its default behavior that the system resource manager had previously indicated where modifiable, such as, for example, the speed with which provided resources are withdrawn after they are deemed to be more useful elsewhere. The directives provided to the storage device driver 50, from the intention manager 220, can, likewise, be instructions to adopt, or deactivate, specific behaviors or mechanisms that the storage device driver 50 had previously indicated it had the capability to adopt or deactivate.

In another embodiment, the directives provided by the intention manager 220 can be in the form of specific criteria or information that a resource manager had previously indicated it could accept. Thus, for example, the intention manager 220 can provide directives to the database manager 20 that can, for example, define variables or specify desired outcomes in a manner that the database manager 20 had previously indicated it could accept. Such directives can be based on, or derived from, the specified intentions as received by the intention manager 220 and can seek to establish a form of a contractual agreement between the resource manager receiving them and the consumer of the resources, insofar as the resource manager can attempt to meet the criteria specified and, should it not be able to do so, can fall short in a requested manner.

Returning to the above example of a photo-centric application to provide greater specificity to the above descriptions, if the intention manager 220 receives information indicating that the user's intention is to browse the images 80, the intention manager 220 can utilize such intention information to generate directives to, for example, the system resource manager 40 and instruct the system resource manager 40 to withdraw resources dedicated to the photo-centric application more slowly, since it is likely, in a browsing operation, that the user will continually be utilizing resources in the generation of thumbnails or other like data that is provided while scrolling. Similarly, the intention manager 220 could utilize some of the criteria, or other variables that the database manager 20 had previously indicated it could accept, to specify, to the database manager, that, for example, the database manager is to display nine thumbnails per screen and the generation of those thumbnails must occur in less than one second and, if the database manager cannot display the nine thumbnails within the specified time, then it is to optimize by first displaying every other thumbnail, or displaying the thumbnails at a lower resolution.

Such directives to the database manager 20 can have been derived by the intention manager 220 based on the intentions received and the nature of the criteria that a resource manager, such as the database manager, indicated it could accept. Thus, in the above example, the database manager 20 can have indicated, to the intention manager 220, that it can accept specifications of quantity of thumbnails to generate at one time, time limits on such generation, resolution limitations, and other like criteria. The intention manager 220 can then have selected, from among such criteria, the most relevant criteria given the received intentions. Thus, in the above example, the intention manager 220 selected criteria relevant to a responsive browsing environment, such as the efficient display of a select number of thumbnails equivalent to the number of thumbnails that fit on a single screen being displayed to the user. In addition, criteria-based directives, such as those provided to the database manager 20 in the above example, can enable the resource manager to determine its own optimal behavior given the constraints specified. Thus, in the above example, it can be the database manager 20, and not the intention manager 220, that can determine how to best provide the requested number of thumbnails within the specified time limit.

The system 200 of FIG. 3 illustrates the intention manager 220 providing directives to all of the resource managers of the system 200. Such an illustration, however, is only meant to indicate that the intention manager 220 has the capability to provide directives to one or more of the resource managers of the system 200, and is not meant to indicate that it provides directives to every one of the resource managers in response to every intention received. More specifically, the intention manager 220 can determine which resource managers possess capabilities, or control resources, that may be relevant to the particular intention, or intentions, received by the intention manager. The intention manager 220 can then send directives only to those resource managers. In an alternative environment, rather than the intention manager 220 performing such filtering, the intention manager can, instead, provide generalized directives to all resource managers and each resource manager can determine, independently and individually, whether they can accept or meaningfully respond to the generalized directives. In such an embodiment, each resource manager can monitor issued directives for those directives that the resource manager can accommodate and each resource manager can ignore those directives that the resource manager does not understand, or to which it cannot meaningfully respond.

In addition, while the above descriptions reference the receipt of one or more intentions which can cause the intention manager 220 to generate directives to one or more resource managers, nothing in the above descriptions should be taken to require the generation of directives in response to each intention received. To the contrary, in one embodiment, the intention manager 220 can, upon receipt of one or more intentions, determine that no directives are appropriate and that no instructions or requests should be communicated to any resource manager. The intention manager 220 can, for example, determine that the resource managers are already in a state in which they are providing optimal support for the intended activity indicated to the intention manager. Alternatively, the intention manager 220 can determine that multiple received intentions in effect "cancel one another out" such that any further changes to one or more resource managers to optimize for one specified intention would likely negatively effect the resource management for the other specified intention, possibly to an equal extent. Consequently, in response to such canceling intentions, the intention manager 220 can determine to issue no directives.

Figure 4:
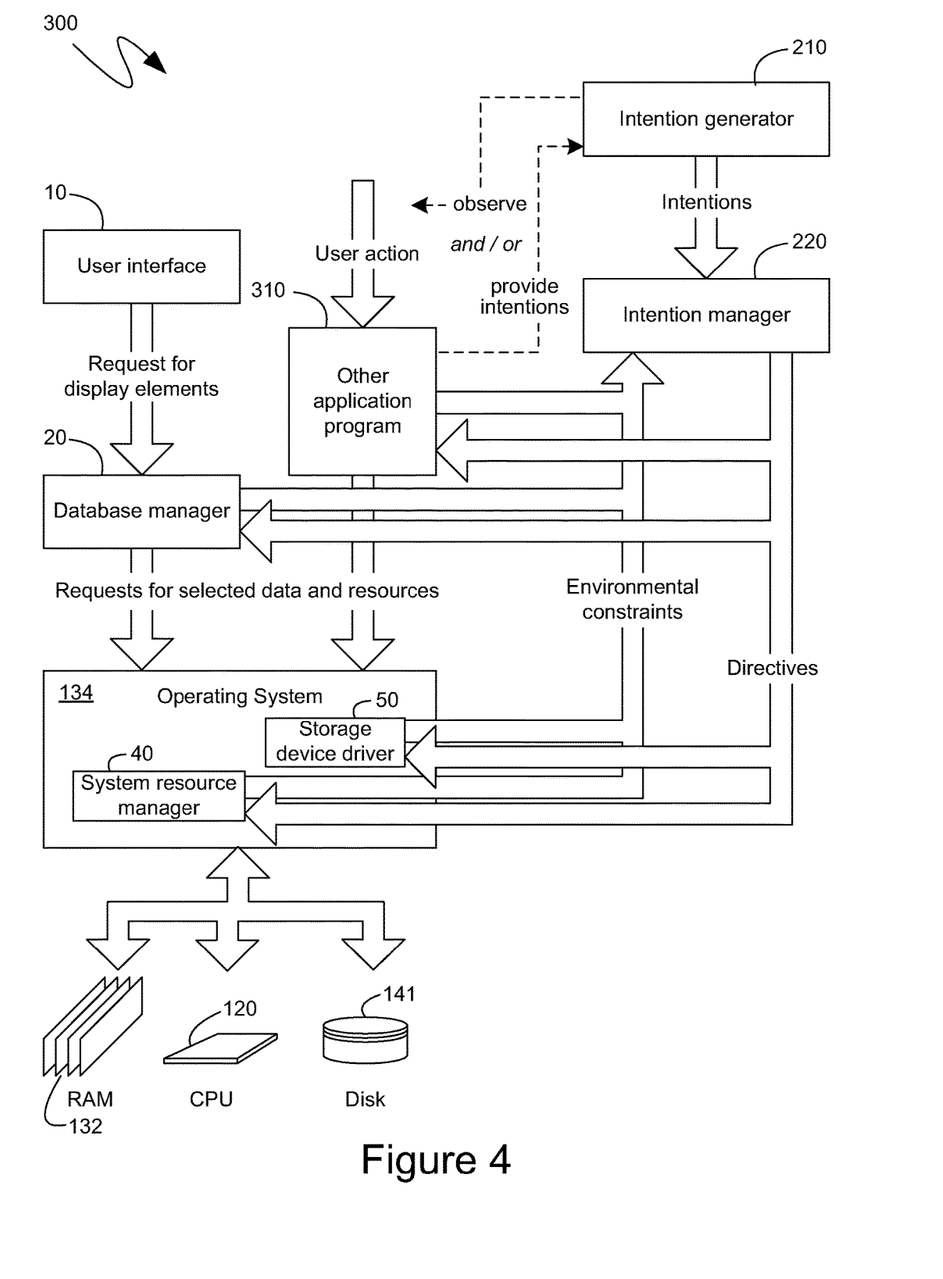
FIG. 4 is a block diagram of multiple exemplary software application programs consuming computing resources whose management is changed in accordance with perceived user intentions.

The system 200 of FIG. 3 illustrates aspects of the operation of the intention manager 220 when the generated intentions are based on programmatically indicated intentions, or based on a user's actions, within the context of an application program or other component of computer-executable instructions, and subsequent directives from the intention manager 220 are directed to resource managers associated with, or utilized by, that application program or component. Turning to FIG. 4, the system 300 illustrates an alternative embodiment where intentions based on a user's actions within the context of one application program or component, or programmatically indicated by that application or component, can result in directives, from the intention manager 220, to resource managers not directly associated with that application program or component.

In particular, as shown in the system 300 of FIG. 4, the intention generator 210 can generate intentions based on its observations of user actions directed to an application program 310 in the same manner as described above with reference to the user interface 10. Similarly, the application program 310 can, likewise, generate programmatic intentions and provide them to the intention generator 210, or even the intention manager 220. Subsequently, as shown, the generated directives from the intention manager 220 can be directed, not only to resource managers that are associated with, or provide resources to, the application program 310, such as the system resource manager 40, the storage device driver 50, and even the application program 310 itself, but the intention manager 220 can also provide directives to resource managers that are orthogonal to the operation of the application program 310, such as the database manager 20. The directives to resource managers not directly providing resources to the application program 310 being utilized by the user can instruct those resource managers to adjust their behavior, and their resource management, to best aid the operation of the application program 310 currently serving the user.

More specifically, resource managers are typically designed to optimize a "typical" user's experience given a limited set of resources. The resource managers described above, however, can have multiple, independent, modes of operation including a default mode that can be directed to optimizing a "typical" user's experience. Such resource managers can further have one or more modes of operation that can seek to minimize the consumption of resources, or otherwise provide for a global optimization of resource consumption or impact. Note that such modes of operation differ significantly from currently implemented resource management technology in that current technology can limit the resources being provided to such a resource manager, but the resource manager still manages those resources in accordance with its one management mechanism. In the presently described embodiment, the resource manager itself can select a different management mechanism that, rather than seeking to optimize a "typical" user's experience, can instead request and utilize fewer resources at the expense of such a user experience.

Returning to the above example of a photo-centric application, the application program 310 can likewise be a photo-centric application program. For example, the user interface 10 and the database manager 20 can provide primarily image organization functionality to the user, while the application program 310 can provide complex image editing capabilities. In such an example, the user's actions directed to the application program 310, such as applying a filter to an image, can enable the intention generator 210 to provide an indication the to the intention manager 220 that the user's intention is to edit an image. Such an intention can cause the intention manager 220 to provide directives to, for example, the system resource manager 40, the storage device driver 50, and the application program 310 itself, though, in the present example, a common intention, such as the editing of an image, may not result in any directives to the system resource manager 40, storage device driver 50 or the application program 310, since their default settings may be optimal for such a "typical" case.

In addition to any directives that the intention manager 220 may provide to other resource managers, the intention manager can also provide directives to the database manager 20, even though the user's intention of editing an image is not being supported by the database manager. In particular, the intention manager 220 can inform the database manager 20 to, for example, consume a smaller amount of computing resources, such as RAM 132 or CPU 120, or it can inform the database manager to complete all actions, or pause all actions, within a specified period of time if the database manager has indicated it can accept such information. The intention manager 220 can, thereby, optimize the operation of the application program 310 by causing other, orthogonal, and simultaneously executing resource managers to adopt mechanisms that can render more efficient the user's actions with respect to the application program 310. Such optimizations are equally applicable if the intentions provided to the intention manager 220 were not based on observed user action with respect to the application program 310, but rather were intentions programmatically generated by the program 310 itself.

Figure 5:
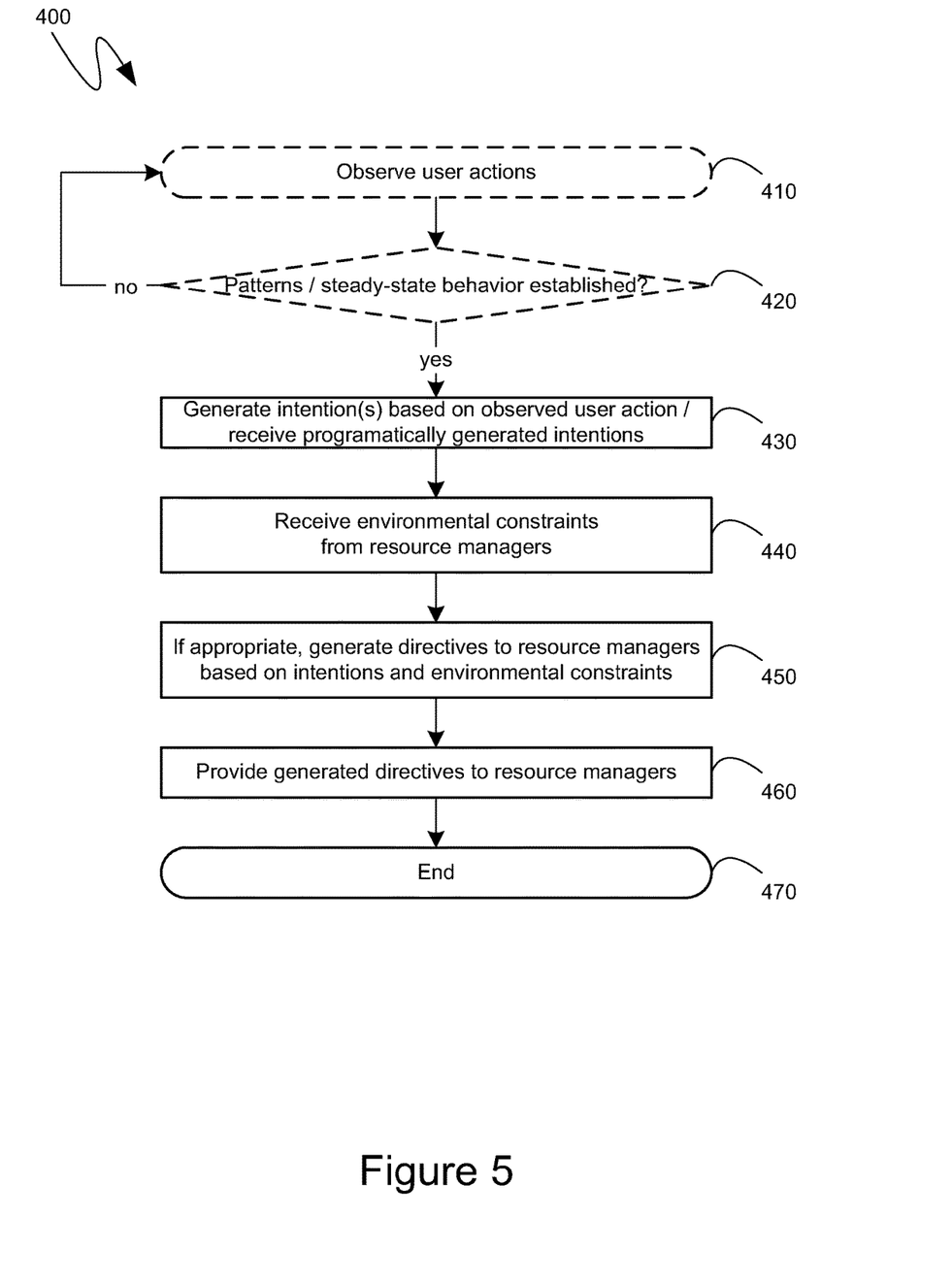
FIG. 5 is a flow diagram illustrating an exemplary mechanism for changing the management of resources based on perceived user intentions.

The operation of the intention generator 210 and the intention manager 220 is further illustrated by the flow diagram 400 of FIG. 5. Turning to FIG. 5, the steps illustrated with dashed lines are, as indicated above, optional. Thus, initially, the user's actions with respect to one or more application programs, components or other computer-executable instructions, can, optionally, be observed at step 410. Such observations can, also optionally, proceed until a steady-state model of the user's behavior has been established that can be utilized to reliably determine user intentions from the user's current actions, such as in the manner described above. Thus, as shown, the observation of the user's actions at step 410 can proceed until the determination, at step 420, determines that a steady-state user behavior has been established.

At step 430, observations of user actions, after a steady-state behavior has been identified, can be used to generate indications of the user's intentions. Alternatively, at step 430, programmatic indications of intentions can be received, such as directly from an application program or component. At step 440, environmental constraints can be received from resource managers. As indicated previously, the environmental constraints can be received at any time and thus, their receipt at step 440 is merely meant to illustrate that they can be received prior to the selection and provision of directives at step 450 and 460, and not to indicate that the environmental constraints cannot be received prior to step 440.

At step 450, as described in detail above, directives to one or more resource managers can be generated based on the environmental constraints and the specified intentions from step 430. As also described above, in certain situations a determination can be made, at step 450, that no directives are appropriate given the one or more specified intentions received, such as, for example, if the user intentions are "typical" and, consequently, no additional directives to the resource managers would be appropriate, or if the specified intentions offset one another such that no further overall optimization could be achieved. If, at step 450, one or more directives were generated, those directives can be provided to the resource managers at step 460. Relevant processing for a particular user action, or set of actions, can then end at step 470.

As can be seen from the above descriptions, mechanisms for dynamically optimizing the operation of resource managers based on specified intentions have been enumerated. In view of the many possible variations of the subject matter described herein, we claim as our invention all such embodiments as may come within the scope of the following claims and equivalents thereto.

We claim:

1. One or more computer-readable memory comprising computer-executable instructions for dynamically changing the operation of a resource manager of hardware-based resources of a computing device, the computer-executable instructions directed to steps comprising:
    detecting user actions which consume the hardware-based resources, the hardware-based resources being managed by the resource manager;
    determining, based on the detected user actions themselves, a user intention in performing the detected user actions;
    receiving, from the resource manager, predefined modes of operation, the resource manager being configured to manage of the hardware-based resources in accordance with one or more of the predefined modes of operation, wherein each of the predefined modes of operation enables the user actions to consume at least some of the hardware-based resources;
    generating, based on the determined user intention, at least one directive, for the resource manager, the at least one generated directive specifying a mode of operation, from among the received predefined modes of operation, of the resource manager; and
    transmitting the at least one directive to the resource manager.

2. The computer-readable memory of claim 1, comprising further computer-executable instructions for monitoring prior user actions to establish a steady-state user behavior; wherein the determining the user intention is based on both the established steady-state user behavior and the detected user actions.

3. The computer-readable memory of claim 1, comprising further computer-executable instructions for monitoring prior user actions to establish a steady-state user behavior; wherein the determining the user intention is also based on how the established steady-state user behavior differs from an expected behavior for which the resource managers has been optimized.

4. The computer-readable memory of claim 1, wherein the generated at least one directive comprises one or more operational criteria of the resource manager, the one or more operational criteria having been established by environmental constraints defining a bounded set of directives that can be accepted by the resource manager.

5. The computer-readable memory of claim 1, wherein the detected user actions are directed to an application program, and wherein further the mode of operation specified by the generated at least one directive comprises the resource manager retaining resources, for future user actions directed to the application program, for a longer period of time than such resources would have been retained under a different mode of operation.

6. The computer-readable memory of claim 1, wherein the detected user actions are directed to a first application program and the resource manager is associated with another, different application program.

7. The computer-readable memory of claim 1, wherein at least two of the received predefined modes of operation are alternatives of one another.

8. A computing device comprising:
    an application program utilized by a user of the computing device to perform tasks;
    hardware-based computing resources of the computing device that are consumed by the application program in performing the tasks;
    a resource manager configured to manage the hardware-based computing resources in accordance with one or more predefined modes of operation;
    an intention generator that detects user actions and determines, based on the detected user actions themselves, a user intention in performing the detected user actions; and
    an intention manager that receives predefined modes of operation from the resource manager, wherein each of the predefined modes of operation enables the user's utilization of the application program to consume at least some of the hardware-based resources, and that generates, based on the determined user intention, and subsequently transmits at least one directive, to the resource manager, the generated at least one directive specifying a mode of operation, from among the received predefined modes of operation, of the resource manager.

9. The computing device of claim 8, wherein the intention generator first monitors user actions to establish a steady-state user behavior, and subsequently determines the user intention based on both the established steady-state user behavior and the detected user actions.

10. The computing device of claim 8, wherein the intention generator first monitors user actions to establish a steady-state user behavior, and subsequently determines the user intention also based on how the established steady-state user behavior differs from an expected behavior for which the resource manager has been optimized.

11. The computing device of claim 8, wherein at least two of the modes of operation received by the intention manager are alternatives of one another.

12. The computing device of claim 8, further comprising at another, different application program, wherein the resource manager is associated with the other, different application program.

13. The computing device of claim 8, wherein the mode of operation specified by the generated at least one directive comprises the resource manager retaining resources, for future user actions directed to the application program, for a longer period of time than such resources would have been retained under a different mode of operation.

14. A method for dynamically changing the operation of a resource manager of hardware-based resources of a computing device, the method comprising the steps of:
- detecting, on the computing device, user actions which consume the hardware-based resources, the hardware-based resources being managed by the resource manager;
- determining, on the computing device, based on the detected user actions themselves, a user intentions in performing the detected user actions;
- receiving, on the computing device, from the resource managers, predefined modes of operation, the resource managers being configured to manage at least one of the hardware-based resources in accordance with one or more of the predefined modes of operation, wherein each of the predefined modes of operation enables the user actions to consume at least some of the hardware-based resource;
- generating, on the computing device, based on the determined one or more user intentions, at least one directive, for the resource managers, the at least one generated directive specifying a mode of operation, from among the received predefined modes of operation, of the resource manager; and
- transmitting, from the computing device, the at least one directive to the resource manager.

15. The method of claim 14, wherein the generated at least one directive comprises one or more operational criteria of the resource managers, the one or more operational criteria having been established by environmental constraints defining a bounded set of directives that can be accepted by the resource manager.

16. The method of claim 14, further comprising the steps of: monitoring prior user actions to establish a steady-state user behavior; wherein the determining the user intention is based on both the established steady-state user behavior and the detected user actions.

17. The method of claim 14, further comprising the steps of: monitoring prior user actions to establish a steady-state user behavior; wherein the determining the user intention is also based on how the established steady-state user behavior differs from an expected behavior for which the resource manager has been optimized.

18. The method of claim 14, wherein the detected user actions are directed to an application program, and wherein further the mode of operation specified by the generated at least one directive comprises the resource manager retaining resources, for future user actions directed to the application program, for a longer period of time than such resources would have been retained under a different mode of operation.

19. The method of claim 14, wherein the detected user actions are directed to a first application program and the resource manager is associated with another, different application program.

20. The method of claim 14, wherein at least two of the received predefined modes of operation are alternatives of one another.

* * * * *